United States Patent
Tsuchiya

(10) Patent No.: US 10,397,419 B2
(45) Date of Patent: Aug. 27, 2019

(54) HINGE MECHANISM AND IMAGE FORMING APPARATUS

(71) Applicant: KYOCERA Document Solutions Inc., Osaka (JP)

(72) Inventor: Hiroaki Tsuchiya, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/224,944

(22) Filed: Dec. 19, 2018

(65) Prior Publication Data
US 2019/0208067 A1   Jul. 4, 2019

(30) Foreign Application Priority Data
Dec. 28, 2017   (JP) .................. 2017-253796

(51) Int. Cl.
*H04N 1/00* (2006.01)
*G03G 21/16* (2006.01)
*E05D 7/00* (2006.01)

(52) U.S. Cl.
CPC ..... *H04N 1/00554* (2013.01); *G03G 21/1628* (2013.01); *G03G 21/1633* (2013.01); *H04N 1/00557* (2013.01); *E05D 7/0009* (2013.01)

(58) Field of Classification Search
CPC .......... H04N 1/00554; H04N 1/00557; G03G 21/1628; G03G 21/1633; E05D 7/0009
See application file for complete search history.

(56) References Cited

U.S. PATENT DOCUMENTS

| | | | | |
|---|---|---|---|---|
| 7,804,628 B2* | 9/2010 | Hashimoto | ........ | H04N 1/00543 358/400 |
| 8,774,675 B2* | 7/2014 | Fukuda | ............. | G03G 15/0194 399/110 |
| 9,065,946 B2 | 6/2015 | Inada et al. | | |
| 9,203,995 B2* | 12/2015 | Muraoka | ............ | H04N 1/00554 |
| 2008/0317498 A1* | 12/2008 | Andoh | ................... | G03G 15/60 399/110 |
| 2014/0355084 A1* | 12/2014 | Inada | ................. | H04N 1/00554 358/498 |

FOREIGN PATENT DOCUMENTS

JP   2015-191203 A   11/2015

* cited by examiner

*Primary Examiner* — Neil R McLean
(74) *Attorney, Agent, or Firm* — Studebaker & Brackett PC

(57) ABSTRACT

A hinge mechanism includes a first member, a second member, and a stopper mechanism. The stopper mechanism has a path and a moving member. The moving member is provided in the path. The path includes a first path part and a second path part. The first path part is located in the first member. The second path part is located in the second member. The first member and the second member are changeable between a first communication state, a non-communication state, and a second communication state depending on a turning angle of the second member relative to the first member.

8 Claims, 10 Drawing Sheets

HINGE MECHANISM AND IMAGE FORMING APPARATUS

INCORPORATION BY REFERENCE

The present application claims priority under 35 U.S.C. § 119 to Japanese Patent Application No. 2017-253796, filed on Dec. 28, 2017. The contents of this application are incorporated herein by reference in their entirety.

BACKGROUND

The present disclosure relates to a hinge mechanism and an image forming apparatus.

A known image forming apparatus forms images on sheets. The image forming apparatus includes a document presser, a lock member, a hook member, a spring member, and a linkage member.

The lock member is inserted in an opening when the document presser is closed relative to a scanner section. The hook member comes in an engagement position as a result of the lock member being inserted in the opening. The hook member engages with the lock member as a result of coming in the engagement position. The document presser is locked to be prevented from being opened and closed relative to the scanner section as a result of the hook member engaging with the lock member. That is, the document presser is restricted from pivoting relative to the scanner section. Thus, the document presser can be prevented from becoming open wide by turning toward the back of an apparatus main body when a user opens a document reader. The image forming apparatus can therefore be prevented from being in an unstable state.

The spring member urges the hook member in a direction from a disengagement position toward the engagement position. The linkage member comes in contact with a protrusion when the scanner section is closed relative to the apparatus main body. As a result of the linkage member coming in contact with the protrusion, the hook member moves from the engagement position to the disengagement position against urging force of the spring member. The document presser can be opened or closed relative to the scanner section with the hook member in the disengagement position. That is, the document presser is enabled to pivot relative to the scanner section.

SUMMARY

A hinge mechanism according to an aspect of the present disclosure is for installation between a first cover pivotably supported by a housing and a second cover movable to be placed over the first cover. The hinge mechanism includes a first member, a second member, and a stopper mechanism. The first member is supported by the first cover. The second member is turnably attached to the first member and is fixed to the second cover. The stopper mechanism restricts turning of the second member relative to the first member. The stopper mechanism has a path and a moving member. The moving member is provided in the path. The path includes a first path part and a second path part. The first path part is located in the first member. The second path part is located in the second member. The first member and the second member are changeable between a communication state and a non-communication state depending on a turning angle of the second member relative to the first member. The first member and the second member are in the communication state when the first path part and the second path part are in communication with each other. The first member and the second member are in the non-communication state when the first path part and the second path part are not in communication with each other.

An image forming apparatus according to another aspect of the present disclosure includes the above-described hinge mechanism, the housing, the first cover, the second cover, a reader, and an image forming section. The reader is housed in the first cover and reads an image from an original document. The image forming section is housed in the housing and forms an image on a sheet.

DETAILED DESCRIPTION

Figure 1:
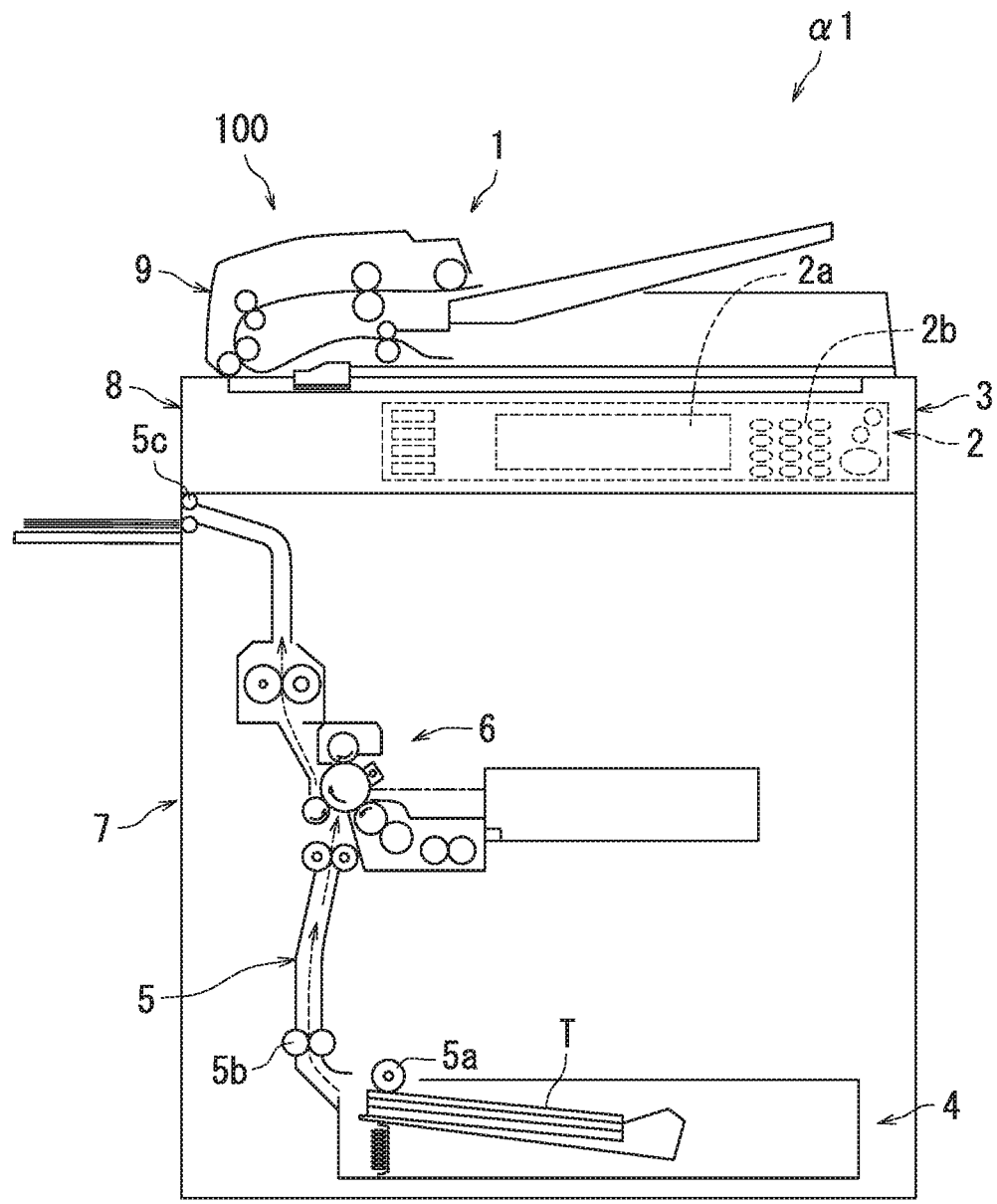
FIG. 1 is a cross-sectional view schematically illustrating an image forming apparatus according to an embodiment of the present disclosure.

The following describes an embodiment of the present disclosure with reference to the accompanying drawings. Note that in the drawings, elements that are the same or substantially equivalent are labelled using the same reference signs and description thereof is not repeated.

The following describes an image forming apparatus 100 according to the embodiment of the present disclosure with reference to FIG. 1. FIG. 1 is a cross-sectional view schematically illustrating the image forming apparatus 100.

As illustrated in FIG. 1, the image forming apparatus 100 includes a feeder 1, an input section 2, a reader 3, a cassette 4, a sheet feed roller 5a, a conveyance roller 5b, an ejection roller 5c, an image forming section 6, a housing 7, a first cover 8, and a second cover 9.

The feeder 1 conveys an original document B having a scan target image thereon to the reader 3. The reader 3 scans the original document B to acquire image data. The reader 3 is for example a contact image sensor (CIS). The reader 3 for example includes a light emitting section such as light emitting diodes (LEDs) and an imaging section such as an image sensor. The image is scanned from the original document B through the light emitting section and the imaging section. The input section 2 includes a display section 2a and a set of operation keys 2b. The input section 2 receives an instruction from a user to the image forming apparatus 100. The display section 2a functions as a touch panel. The input section 2 in such a configuration includes a touch panel.

The cassette 4 accommodates sheets T. The sheets T are for example plain paper, recycled paper, thin paper, thick paper, or overhead projector (OHP) sheets. The sheet feed roller 5a feeds a sheet T from the cassette 4. The conveyance roller 5b forwards the sheet T fed by the sheet feed roller 5a to the image forming section 6.

The image forming section 6 forms an image on the sheet T. Specifically, the image is a toner image. The image forming section 6 includes a photosensitive drum, a charger, a light exposure section, a developing section, a transfer section, a cleaner, and a static eliminating section. The photosensitive drum, the charger, the light exposure section, the developing section, and the transfer section are used to form the image on the sheet T. The cleaner removes toner remaining on a surface of the photosensitive drum. The static eliminating section eliminates residual charge from the surface of the photosensitive drum. After forming the image on the sheet T, the image forming section 6 forwards the sheet T to a fixing section. The fixing section applies heat and pressure to the image to fix the image to the sheet T. Note that the image forming section 6 may have nozzles and form the image on the sheet T by ejecting ink from the nozzles.

After the sheet T has passed through the image forming section 6, the ejection roller 5c ejects the sheet T out of the housing 7 of the image forming apparatus 100.

The housing 7 has a hollow structure. The housing 7 houses the cassette 4, the sheet feed roller 5a, the conveyance roller 5b, the ejection roller 5c, and the image forming section 6.

The first cover 8 has a hollow structure. The first cover 8 houses the reader 3. The first cover 8 is disposed above the housing 7. The first cover 8 is pivotably supported by the housing 7. The first cover 8 opens and closes the top of the housing 7 by pivoting relative to the housing 7. A service technician or a user for example opens the first cover 8 to perform maintenance of the image forming section 6.

The second cover 9 has a hollow structure. The second cover 9 houses the feeder 1. The second cover 9 is disposed above the first cover 8. The second cover 9 is movable to be placed over the first cover 8.

Figure 2:
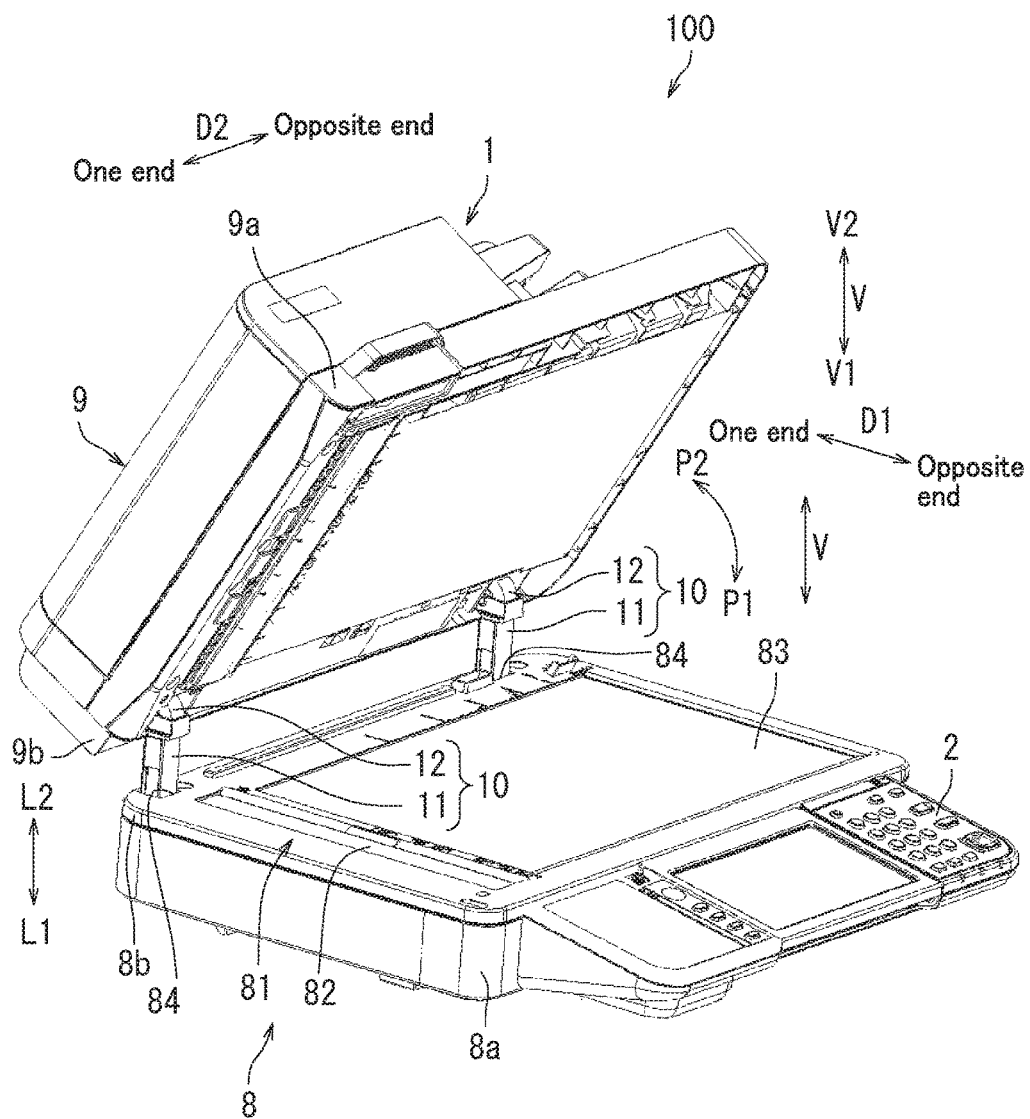
FIG. 2 is a perspective view illustrating a portion of the image forming apparatus.

The following further describes the image forming apparatus 100 with reference to FIG. 2. FIG. 2 is a perspective view illustrating a portion of the image forming apparatus 100.

As illustrated in FIG. 2, the first cover 8 includes a top section 81, a facing section 82, and a loading section 83.

The top section 81 is a plate-shaped member. The top section 81 is located in an upper portion of the first cover 8.

The facing section 82 is disposed in the top section 81. The facing section 82 is disposed on a conveyance path of the original document B that is conveyed by the feeder 1. The facing section 82 is for example contact glass.

The loading section 83 is disposed in the top section 81. The original document B can be loaded on the loading section 83. The loading section 83 is for example contact glass.

The first cover 8 further includes a pivotable edge portion 8a and a fixed edge portion 8b. The fixed edge portion 8b of the first cover 8 is at one end in a first direction D1. The pivotable edge portion 8a of the first cover 8 is at an opposite end in the first direction D1. The first direction D1 in the present embodiment is a front-back direction of the image forming apparatus 100.

The first cover 8 further includes a pair of support holes 84. Each of the support holes 84 is formed in the upper portion of the first cover 8. Each of the support holes 84 provides communication between the interior and the exterior of the first cover 8. Each of the support holes 84 extends in an up-down direction V. Each of the support holes 84 is located in the fixed edge portion 8b. The support holes 84 are spaced in a second direction D2. Each of the support holes 84 opens toward the second cover 9. The second direction D2 means a direction orthogonal to the first direction D1. The second direction D2 in the present embodiment is a width direction of the image forming apparatus 100.

The input section 2 is disposed on the first cover 8 at the opposite end in the first direction D1. The user therefore faces the first cover 8 from the opposite end in the first direction D1 in order to operate the input section 2.

The second cover 9 is disposed above the first cover 8. The second cover 9 is movable to be placed over the first cover 8. The second cover 9 faces the facing section 82 and the loading section 83 while the second cover 9 is placed over the first cover 8.

The reader 3 reads an image from the original document B passing through the facing section 82 by being conveyed by the feeder 1. Alternatively, the reader 3 reads the image from the original document B loaded on the loading section 83.

The image forming apparatus 100 further includes a pair of hinge mechanisms 10.

Figure 3:
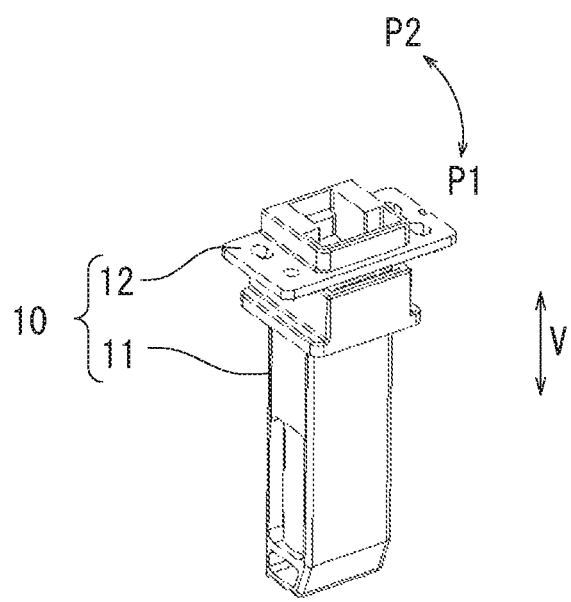
FIG. 3 is a perspective view of a hinge mechanism.

The following describes the hinge mechanisms 10 with reference to FIGS. 2 and 3. FIG. 3 is a perspective view of one of the hinge mechanisms 10.

As illustrated in FIG. 2, the hinge mechanisms 10 are spaced in the second direction D2.

The hinge mechanisms 10 have the same configuration. The following describes one of the hinge mechanisms 10 to explain the configuration of the hinge mechanisms 10.

As illustrated in FIGS. 2 and 3, the hinge mechanism 10 is installed between the second cover 9 and the first cover 8. The hinge mechanism 10 supports the second cover 9 so that the second cover 9 is pivotable relative to the first cover 8 and the second cover 9 is movable relative to the first cover 8 in the up-down direction V. The hinge mechanism 10 and the second cover 9 integrally move in the up-down direction V.

The hinge mechanism 10 includes a first member 11 and a second member 12.

The first member 11 is supported by the first cover 8. A lower portion of the first member 11 is inserted in one of the support holes 84. An upper portion of the first member 11 protrudes upward from the first cover 8. The first member 11 slides along the support hole 84. The first member 11 moves integrally with the second cover 9.

The second member 12 is turnably attached to the first member 11. The second cover 9 is fixed to the second member 12. The second member 12 turns integrally with the second cover 9.

The second cover 9 includes a pivotable edge portion 9a and a fixed edge portion 9b. The pivotable edge portion 9a of the second cover 9 is at the opposite end in the first direction D1. The fixed edge portion 9b of the second cover 9 is at the one end in the first direction D1.

The second cover 9 is pivotable about the fixed edge portion 9b. The pivotable edge portion 9a of the second cover 9 moves toward or away from the first cover 8 as the second cover 9 pivots.

The direction in which the pivotable edge portion 9a of the second cover 9 approaches the first cover 8 as the second cover 9 pivots is also described as a closing direction P1. The pivotable edge portion 9a of the second cover 9 pivots in a downward direction V1 in the up-down direction V as the second cover 9 pivots in the closing direction P1. As a result, the second cover 9 is closed. The pivotable edge portion 9a of the second cover 9 comes in contact with the first cover 8 as a result of the second cover 9 being closed.

The direction in which the pivotable edge portion 9a of the second cover 9 moves away from the first cover 8 as the second cover 9 pivots is also described as an opening direction P2. The pivotable edge portion 9a of the second cover 9 pivots in an upward direction V2 in the up-down direction V as the second cover 9 pivots in the opening direction P2. As a result, the second cover 9 opens. The pivotable edge portion 9a of the second cover 9 separates from the first cover 8 as a result of the second cover 9 being open.

The second cover 9 is supported so as to be movable in an approaching direction L1 and a separating direction L2 relative to the first cover 8. The second cover 9 moves together with the first member 11. The approaching direction L1 means a direction in which the first member 11 moves into the support hole 84. The separating direction L2 means a direction in which the first member 11 moves out of the support hole 84. On condition that the first cover 8 is closed, the approaching direction L1 is defined as a direction toward the downward direction V1 in the up-down direction V and the separating direction L2 is defined as a direction toward the upward direction V2 in the up-down direction V. The up-down direction V according to the present embodiment is orthogonal both to the first direction D1 and to the second direction D2.

When the second cover 9 moves in the approaching direction L1, the second cover 9 approaches the first cover 8. As a result, the second cover 9 is closed. On the contrary, when the second cover 9 moves in the separating direction L2, the second cover 9 separates from the first cover 8. As a result, the second cover 9 opens.

Figure 4:
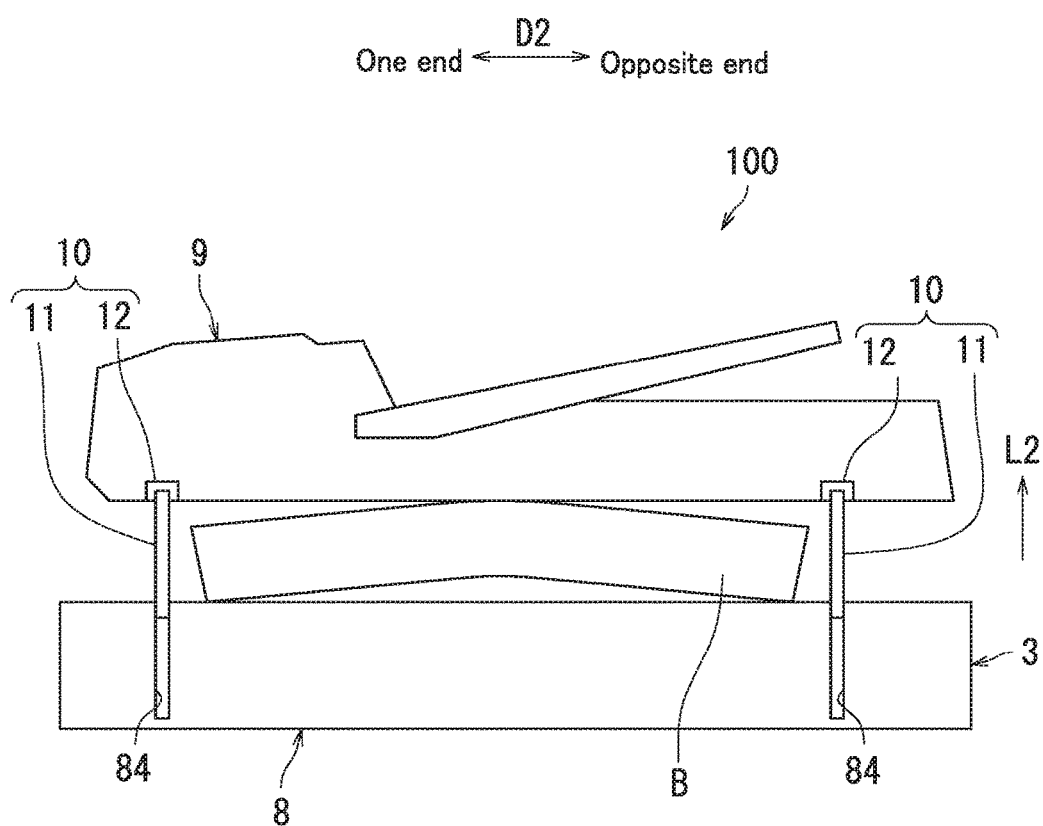
FIG. 4 is a cross-sectional view schematically illustrating a use of the hinge mechanism.

The following describes a use of the hinge mechanisms 10 with reference to FIG. 4. FIG. 4 is a cross-sectional view schematically illustrating the use of the hinge mechanisms 10.

As illustrated in FIG. 4, a thick book B, which is an example of the original document B, can be placed between the first cover 8 and the second cover 9 by moving the second cover 9 in the separating direction L2 away from the first cover 8 to increase the space between the second cover 9 and the first cover 8. Consequently, the thick book B is held between the first cover 8 and the second cover 9, so that the reader 3 can read an image from the thick book B.

Figure 5:
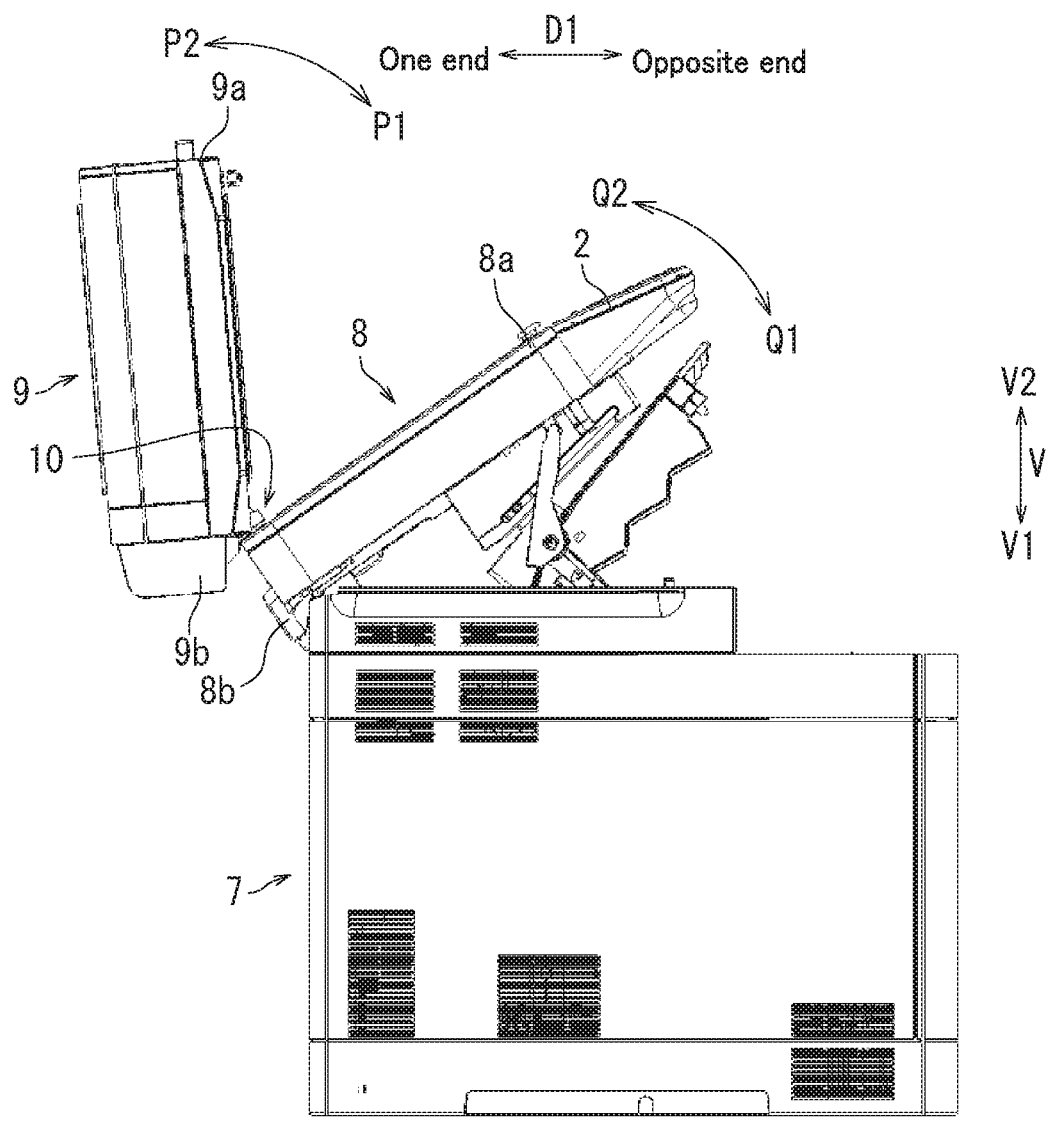
FIG. 5 is a side view illustrating a first cover.

The following describes the first cover 8 with reference to FIG. 5. FIG. 5 is a side view illustrating the first cover 8.

As illustrated in FIG. 5, the first cover 8 pivots about the fixed edge portion 8b. The pivotable edge portion 8a of first cover 8 moves toward or away from the housing 7 as the first cover 8 pivots.

The direction in which the pivotable edge portion 8a of the first cover 8 approaches the housing 7 as the first cover 8 pivots is also described as a closing direction Q1. The pivotable edge portion 8a of the first cover 8 pivots in the downward direction V1 in the up-down direction V as the first cover 8 pivots in the closing direction Q1. As a result, the first cover 8 is closed. The pivotable edge portion 8a of the first cover 8 comes in contact with the housing 7 as a result of the first cover 8 being closed. The thus closed first cover 8 closes the top of the housing 7.

The direction in which the pivotable edge portion 8a of the first cover 8 moves away from the housing 7 as the first cover 8 pivots is also described as an opening direction Q2. The pivotable edge portion 8a of the first cover 8 pivots in the upward direction V2 in the up-down direction V as the first cover 8 pivots in the opening direction Q2. As a result, the first cover 8 opens. The pivotable edge portion 8a of the first cover 8 separates from the housing 7 as a result of the first cover 8 being open. The top of the housing 7 opens as a result of the pivotable edge portion 8a of the first cover 8 separating from the housing 7.

The hinge mechanisms 10 pivot together with the first cover 8.

Figure 6:
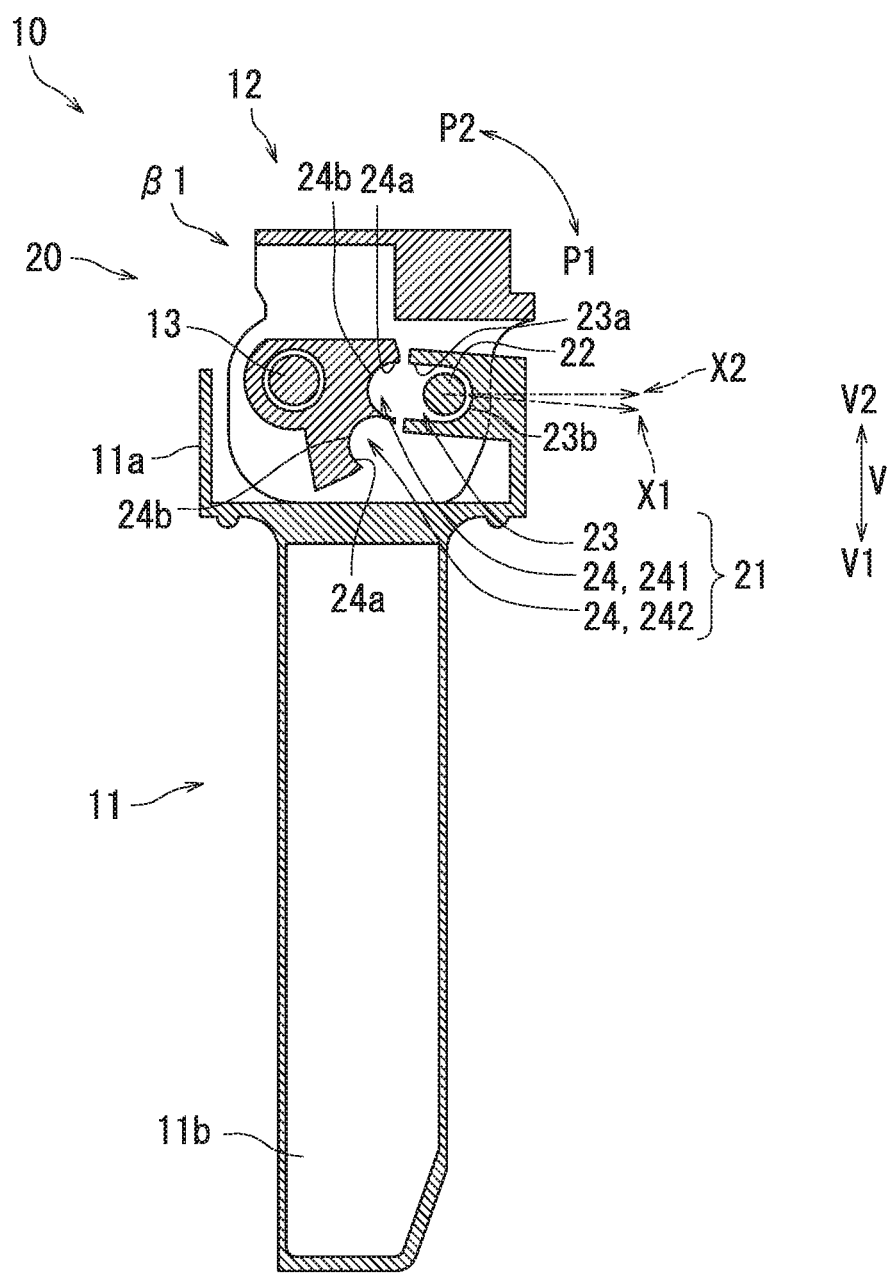
FIG. 6 is a cross-sectional view schematically illustrating a state of the hinge mechanism in the image forming apparatus in a first state.

The following describes the hinge mechanisms 10 with reference to FIG. 6. FIG. 6 is a cross-sectional view schematically illustrating one of the hinge mechanisms 10. Specifically, FIG. 6 is a cross-sectional view schematically illustrating a state of the hinge mechanism 10 in the image forming apparatus 100 in a first state $\alpha 1$. The image forming apparatus 100 is in the first state $\alpha 1$ when both the first cover 8 and the second cover 9 are closed as illustrated in FIG. 1.

As illustrated in FIG. 6, the hinge mechanism 10 further includes a rotary shaft 13 and a stopper mechanism 20.

The first member 11 has an upper portion 11a and a lower portion 11b. The second member 12 is disposed in the upper portion 11a. The rotary shaft 13 penetrates the upper portion 11a and the second member 12. Thus, the second member 12 is mounted in the upper portion 11a so as to be turnable about the rotary shaft 13. The second member 12 turns about the rotary shaft 13 in the closing direction P1 and in the opening direction P2.

The lower portion 11b is inserted in the support hole 84 (see FIG. 4) of the first cover 8.

The stopper mechanism 20 restricts turning of the second member 12 relative to the first member 11.

The stopper mechanism 20 has a path 21 and a moving member 22.

The path 21 includes a large path part (an example of what may be referred to as a first path part) 23 and a plurality of small path parts (an example of what may be referred to as a second path part) 24.

The large path part 23 has a size that is large enough to accommodate the entirety of the moving member 22.

The large path part 23 is a hole formed in the first member 11. The large path part 23 may be formed directly in the first member 11 or may be formed indirectly in the first member 11. For example, the large path part 23 being formed indirectly in the first member 11 means that the large path part 23 is formed in another member fixed to the first member 11. The large path part 23 moves integrally with the first member 11.

According to the present embodiment, the large path part 23 is formed in the upper portion 11a of the first member 11.

The large path part 23 has an opening 23a and a bottom 23b. The opening 23a provides communication between the interior and the exterior of the large path part 23. The bottom 23b means a bottom of the hole constituting the large path part 23.

Each of the small path parts 24 is an example of a small path part of the present disclosure. Each of the small path parts 24 has a size that is not large enough to accommodate the entirety of the moving member 22 but is large enough to accommodate a portion of the moving member 22.

Each of the small path parts 24 is a hole formed in the second member 12. Each of the small path parts 24 may be formed directly in the second member 12 or may be formed indirectly in the second member 12. For example, each of the small path parts 24 being formed indirectly in the second member 12 means that each of the small path parts 24 is formed in another member fixed to the second member 12. Each of the small path parts 24 moves integrally with the second member 12.

The small path parts 24 include a first small path part 241 and a second small path part 242. The first small path part 241 is located downstream of the second small path part 242 in the opening direction P2.

Each of the first small path part 241 and the second small path part 242 has an opening 24a and a bottom 24b.

The opening 24a of the first small path part 241 provides communication between the interior and the exterior of the first small path part 241. The bottom 24b of the first small path part 241 means a bottom of the hole constituting the first small path part 241.

The opening 24a of the second small path part 242 provides communication between the interior and the exterior of the second small path part 242. The bottom 24b of the second small path part 242 means a bottom of the hole constituting the second small path part 242.

The moving member 22 is provided in the path 21. The moving member 22 is for example a metal sphere. The moving member 22 moves under its own weight in the path 21. In other words, the moving member 22 moves under gravity in the path 21. That is, the moving member 22 can be caused to move in the path 21 in the downward direction V1 by tilting the path 21.

According to the present embodiment, the moving member 22 rolls in the path 21. However, the present disclosure is not limited as such. The moving member 22 may slide in the path 21. In such a configuration, for example, a member having a polygonal column shape or a polygonal pyramid shape may be used as the moving member 22.

When the moving member 22 is on the bottom 23b of the large path part 23, the entirety of the moving member 22 is accommodated in the large path part 23.

When the moving member 22 is on the bottom 24b of any of the small path parts 24, a portion of the moving member 22 is accommodated in the small path part 24 and another portion of the moving member 22 protrudes from the small path part 24.

The following describes a state of the hinge mechanisms 10 when the image forming apparatus 100 is in the first state α1 with reference to FIGS. 1 and 6.

As illustrated in FIGS. 1 and 6, the second cover 9 is closed when the image forming apparatus 100 is in the first state α1. The large path part 23 is in communication with the first small path part 241 when the second cover 9 is closed. The large path part 23 communicates with the first small path part 241 through the opening 23a and the opening 24a. A location where the opening 23a of the large path part 23 and the opening 24a of the first small path part 241 face each other when the large path part 23 and the first small path part 241 are in communication with each other is referred to as an interface location between the large path part 23 and the first small path part 241. The moving member 22 can move from the large path part 23 to the first small path part 241 when the large path part 23 is in communication with the first small path part 241. A state of the first member 11 and the second member 12 with the large path part 23 in communication with the first small path part 241 is referred to as a first communication state β1.

The first cover 8 is closed when the image forming apparatus 100 is in the first state α1. A path direction X1 tilts downward relative to a horizontal direction X2 when the first cover 8 is closed. Accordingly, the moving member 22 is on the bottom 23b of the large path part 23. Thus, the moving member 22 is prevented from interfering with the second cover 9 to enable the second cover 9 to pivot relative to the first cover 8. As a result, the second cover 9 can pivot relative to the first cover 8. The path direction X1 means a direction from the opening 23a toward the bottom 23b of the large path part 23.

The path direction X1 tilts downward relative to the horizontal direction X2 when the first cover 8 is closed. The moving member 22 can therefore be kept on the bottom 23b of the large path part 23 as long as the first cover 8 is closed.

Figure 7A:
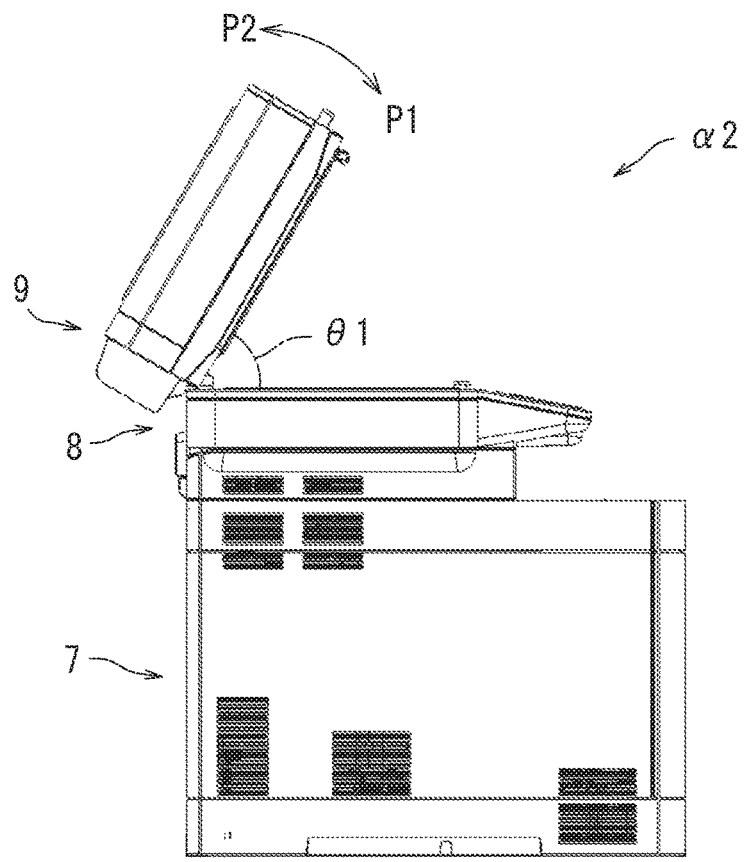
FIG. 7A is a side view illustrating the image forming apparatus in a second state.
Figure 7B:
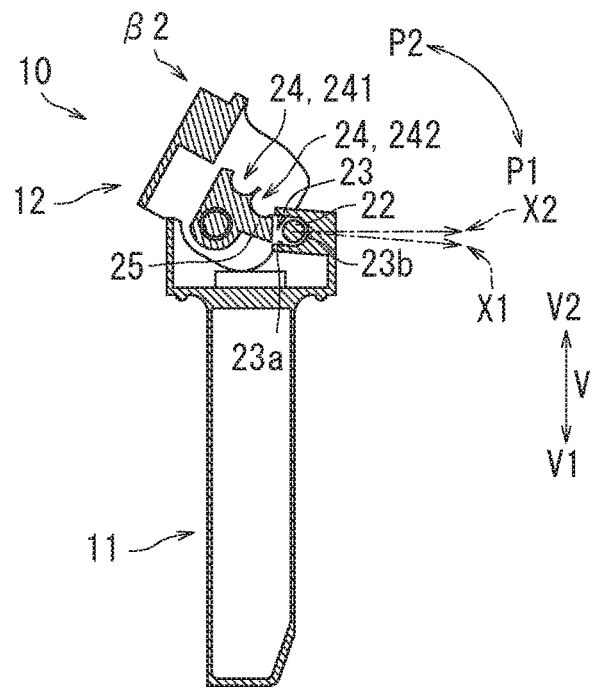
FIG. 7B is a cross-sectional view schematically illustrating the hinge mechanism in the image forming apparatus in the second state.

The following describes a state of the hinge mechanisms 10 when the image forming apparatus 100 is in a second state α2 with reference to FIGS. 7A and 7B. FIG. 7A is a side view illustrating the image forming apparatus 100 in the second state α2. FIG. 7B is a cross-sectional view schematically illustrating one of the hinge mechanisms 10 when the image forming apparatus 100 is in the second state α2.

The image forming apparatus 100 is in the second state α2 when the first cover 8 is closed and the second cover 9 is open as illustrated in FIG. 7A.

When the image forming apparatus 100 is in the second state α2, as illustrated in FIGS. 7A and 7B, the second cover 9 is at a first specific angle θ1 relative to the first cover 8 as a result of pivoting in the opening direction P2 by the first specific angle θ1. The large path part 23 is out of communication with the first small path part 241 as a result of the second cover 9 pivoting in the opening direction P2 by the first specific angle θ1. Consequently, the moving member 22 cannot move from the large path part 23 to the first small path part 241. The large path part 23 is also out of communication with the second small path part 242 as a result of the second cover 9 pivoting in the opening direction P2 by the first specific angle θ1. Consequently, the moving member 22 cannot move from the large path part 23 to the second small path part 242. A state of the first member 11 and the second member 12 with both the first small path part 241 and the second small path part 242 out of communication with the large path part 23 is referred to as a non-communication state β2.

The hinge mechanism 10 further includes a facing section 25. According to the present embodiment, the second member 12 has the facing section 25. The facing section 25 faces the opening 23a when the first member 11 and the second member 12 are in the non-communication state β2. Thus, the moving member 22 can be prevented from falling off the large path part 23.

The first cover 8 is closed when the image forming apparatus 100 is in the second state α2. Accordingly, the path direction X1 tilts downward relative to the horizontal direction X2, and the moving member 22 is on the bottom 23b of the large path part 23 (see FIG. 6). Thus, the moving member 22 is prevented from interfering with the second cover 9 to enable the second cover 9 to pivot relative to the closed first cover 8. As a result, the second cover 9 can pivot relative to the first cover 8.

As described above with reference to FIGS. 6 to 7B, the first member 11 and the second member 12 are changeable between the first communication state β1 and the non-communication state β2 depending on a turning angle of the second member 12 relative to the first member 11. The moving member 22 is provided in the path 21. The second cover 9 is restricted from pivoting relative to the first cover 8 when the first member 11 and the second member 12 are in the first communication state β1 and the moving member 22 is at the interface location between the large path part 23 and the first small path part 241. As a result, the second cover 9 is kept closed relative to the first cover 8. When the moving member 22 is not at the interface location between the large path part 23 and the first small path part 241, the second cover 9 is enabled to pivot relative to the first cover 8. As a result, the second cover 9 can be opened or closed relative to the first cover 8.

Switching of the second cover 9 between being restricted from pivoting and being enabled to pivot relative to the first cover 8 can be achieved by merely processing the structure of the hinge mechanisms 10. Specifically, switching of the second cover 9 between being restricted from pivoting and being enabled to pivot relative to the first cover 8 can be achieved by merely forming the large path part 23 in the first member 11, forming the small path parts 24 in the second member 12, and providing the moving member 22 in the path 21. That is, neither the first cover 8 nor the second cover 9 needs to be processed. Thus, switching of the second cover 9 between being restricted from pivoting and being enabled to pivot relative to the first cover 8 can be achieved by a simple structure.

Figure 8A:
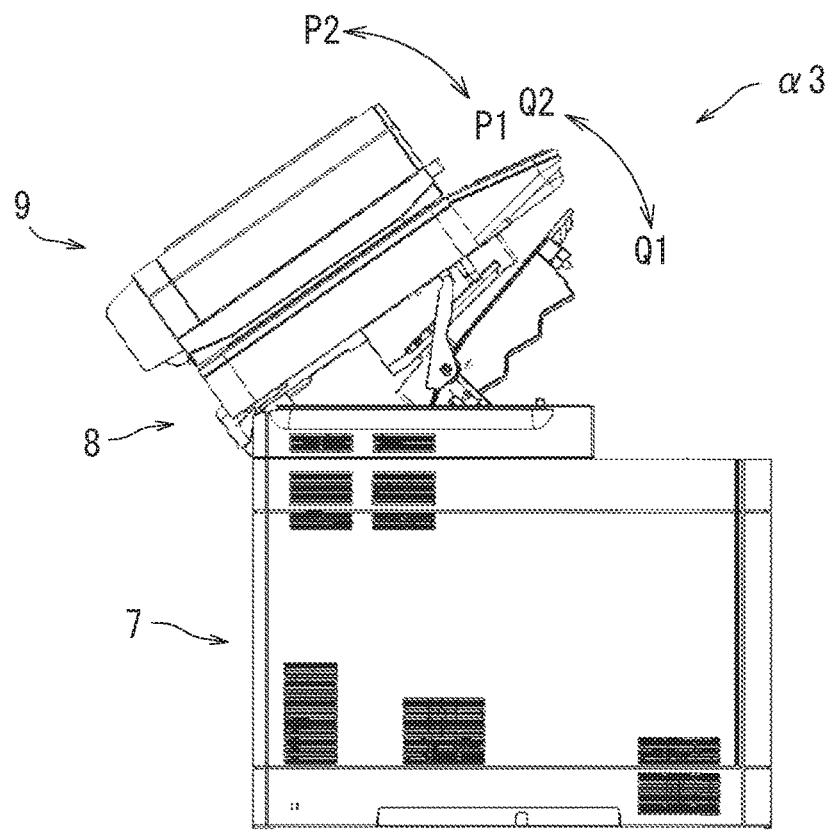
FIG. 8A is a side view illustrating the image forming apparatus in a third state.
Figure 8B:
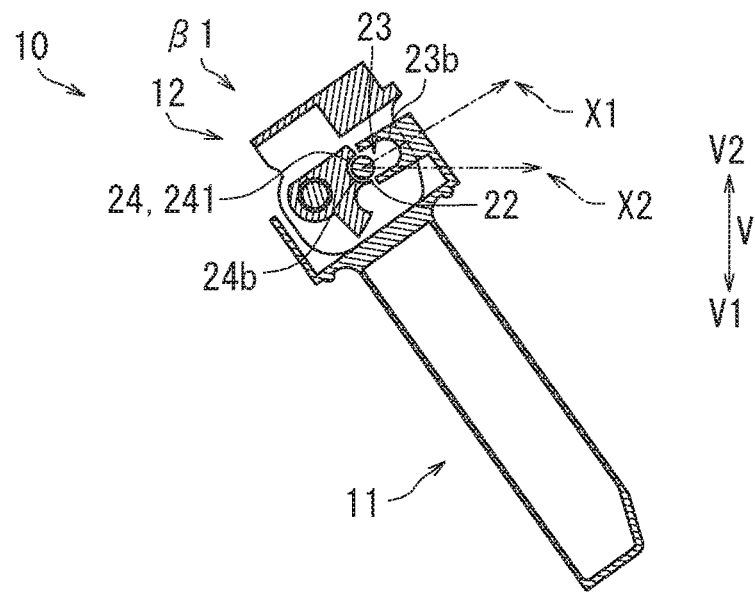
FIG. 8B is a cross-sectional view schematically illustrating the hinge mechanism in the image forming apparatus in the third state.

The following describes a state of the hinge mechanisms 10 when the image forming apparatus 100 is in a third state α3 with reference to FIGS. 8A and 8B. FIG. 8A is a side view illustrating the image forming apparatus 100 in the third state α3. FIG. 8B is a cross-sectional view schematically illustrating one of the hinge mechanisms 10 when the image forming apparatus 100 is in the third state α3.

The image forming apparatus 100 is in the third state α3 when the first cover 8 is opened and the second cover 9 is closed as illustrated in FIG. 8A.

As illustrated in FIGS. 8A and 8B, the second cover 9 is closed when the image forming apparatus 100 is in the third state α3. The first member 11 and the second member 12 are in the first communication state β1 when the second cover 9 is closed.

The path direction X1 tilts upward relative to the horizontal direction X2 when the image forming apparatus 100 is in the third state α3 with the first cover 8 open, that is, with the first cover 8 having pivoted in the opening direction Q2.

The first member 11 and the second member 12 are in the first communication state β1, and the path direction X1 tilts upward relative to the horizontal direction X2 when the image forming apparatus 100 is in the third state α3. Accordingly, the moving member 22 moves under its own weight from the bottom 23b of the large path part 23 to the bottom 24b of the first small path part 241.

A portion of the moving member 22 having reached the bottom 24b of the first small path part 241 is in the first small path part 241, and another portion thereof is in the large path part 23. In other words, the moving member 22 is at the interface location between the large path part 23 and the first small path part 241. The moving member 22 at such a location interferes with the second member 12 when the second cover 9 pivots relative to the first cover 8. As a result, the second member 12 is restricted from turning relative to the first member 11. Consequently, the second cover 9 is restricted from pivoting relative to the first cover 8. The second cover 9 is kept closed by the second member 12 being restricted from turning relative to the first member 11 with the moving member 22 at the interface location between the large path part 23 and the first small path part 241.

Furthermore, the second cover 9 can be prevented from opening by the moving member 22 being at the interface location between the large path part 23 and the first small path part 241. The second cover 9 can therefore be prevented from opening under its own weight when the user opens the first cover 8 with the second cover 9 closed relative to the first cover 8. The image forming apparatus 100 can therefore be prevented from being in an unstable state.

When the image forming apparatus 100 changes from the third state α3 to the first state α1 (see FIGS. 1 and 7) as a result of the first cover 8 being closed, the path direction X1 tilts downward relative to the horizontal direction X2. As a result of the path direction X1 tilting downward relative to the horizontal direction X2, the moving member 22 moves from the bottom 24b of the first small path part 241 to the bottom 23b of the large path part 23. Thus, the moving member 22 is accommodated in the large path part 23 and is no longer at the interface location between the large path part 23 and the first small path part 241. As a result, the second member 12 is enabled to turn relative to the first member 11.

Figure 9A:
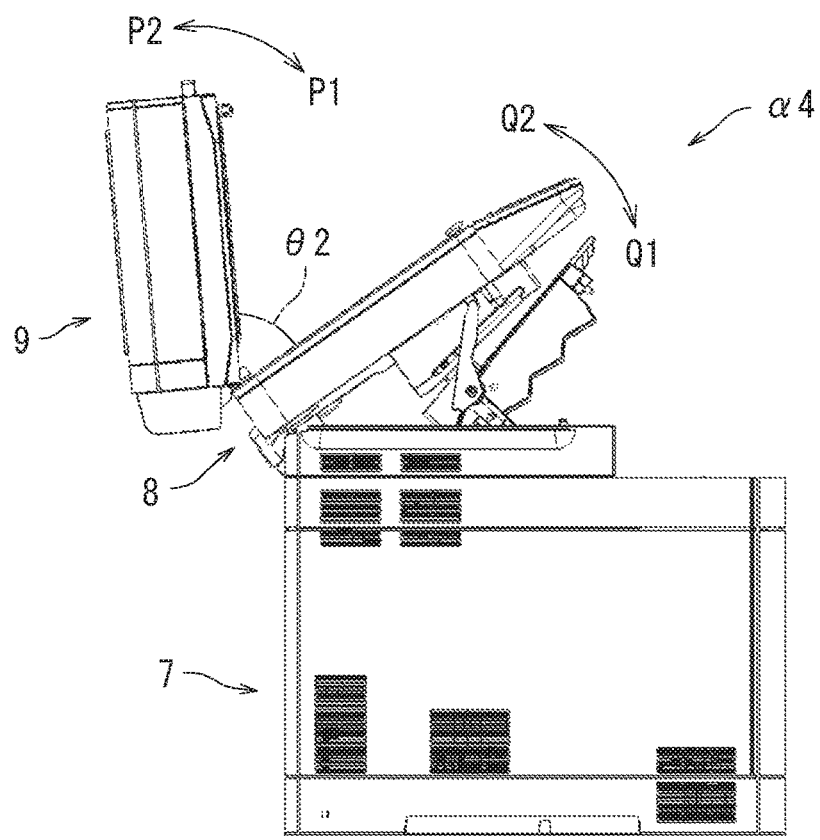
FIG. 9A is a side view illustrating the image forming apparatus in a fourth state.
Figure 9B:
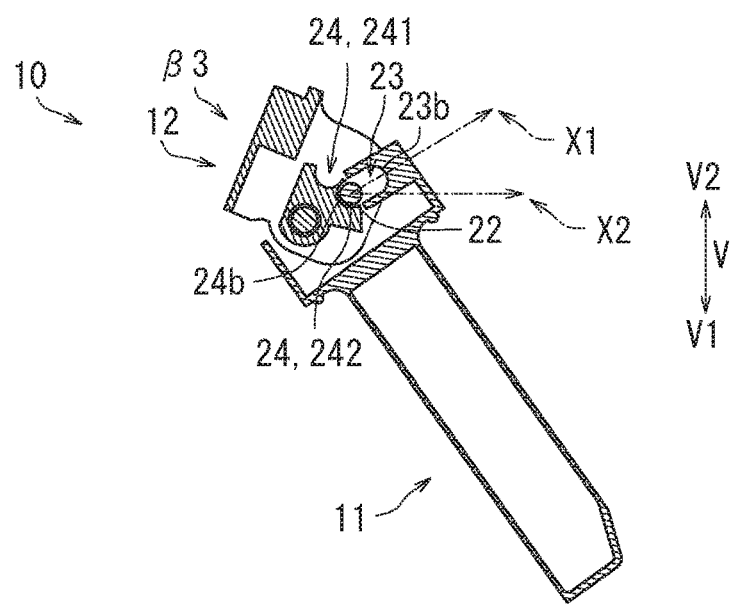
FIG. 9B is a cross-sectional view schematically illustrating the hinge mechanism in the image forming apparatus in the fourth state.

The following describes a state of the hinge mechanisms 10 when the image forming apparatus 100 is in a fourth state α4 with reference to FIGS. 9A and 9B. FIG. 9A is a side view illustrating the image forming apparatus 100 in the fourth state α4. FIG. 9B is a cross-sectional view schematically illustrating one of the hinge mechanisms 10 when the image forming apparatus 100 is in the fourth state α4.

The image forming apparatus 100 is in the fourth state α4 when the first cover 8 is open and the second cover 9 is also open as illustrated in FIG. 9A.

When the image forming apparatus 100 is in the fourth state α4, as illustrated in FIGS. 9A and 9B, the second cover 9 is at a second specific angle θ2 relative to the first cover 8 as a result of pivoting in the opening direction P2 by the second specific angle θ2. The large path part 23 is out of communication with the first small path part 241 as a result of the second cover 9 pivoting in the opening direction P2 by the second specific angle θ2. On the other hand, the large path part 23 is in communication with the second small path part 242 as a result of the second cover 9 pivoting in the opening direction P2 by the second specific angle θ2. A location where the opening 23a of the large path part 23 and the opening 24a of the second small path part 242 face each other when the large path part 23 and the second small path part 242 are in communication with each other is referred to as an interface location between the large path part 23 and the second small path part 242. The moving member 22 can move from the large path part 23 to the second small path part 242 when the large path part 23 is in communication with the second small path part 242. A state of the first member 11 and the second member 12 with the large path part 23 in communication with the second small path part 242 is referred to as a second communication state β3.

The path direction X1 tilts upward relative to the horizontal direction X2 (see FIG. 9B) when the image forming apparatus 100 is in the fourth state α4 with the first cover 8 open, that is, with the first cover 8 having pivoted in the opening direction Q2.

The first member 11 and the second member 12 are in the second communication state β3, and the path direction X1 tilts upward relative to the horizontal direction X2 when the image forming apparatus 100 is in the fourth state α4. Accordingly, the moving member 22 moves under its own weight from the bottom 23b of the large path part 23 to the bottom 24b of the second small path part 242.

A portion of the moving member 22 having reached the bottom 24b of the second small path part 242 is in the second small path part 242, and another portion thereof is in the large path part 23. In other words, the moving member 22 is at the interface location between the large path part 23 and the second small path part 242. The moving member 22 at such a location interferes with the second member 12 when the second cover 9 pivots relative to the first cover 8. As a result, the second member 12 is restricted from turning relative to the first member 11. Consequently, the second cover 9 is restricted from pivoting relative to the first cover 8. The second cover 9 is kept open by the second specific angle θ2 in the opening direction P2 relative to the first cover 8 (the first member 11) by the second member 12 being restricted from turning relative to the first member 11 with the moving member 22 at the interface location between the large path part 23 and the second small path part 242.

Furthermore, the second cover 9 can be prevented from further opening by the moving member 22 being at the interface location between the large path part 23 and the second small path part 242. The second cover 9 can therefore be prevented from further opening under its own weight when the user opens the first cover 8 with the second cover 9 open relative to the first cover 8. The image forming apparatus 100 can therefore be prevented from being in an unstable state.

When the image forming apparatus 100 changes from the fourth state α4 to the first state α1 (see FIGS. 1 and 7), and thus the first cover 8 is closed, the path direction X1 tilts downward relative to the horizontal direction X2. Accordingly, the moving member 22 moves to the bottom 23b of the large path part 23. As a result, the second member 12 is enabled to turn relative to the first member 11.

As described above with reference to FIGS. 8A to 9B, the path 21 has a plurality of small path parts 24. The second cover 9 can therefore be restricted from pivoting relative to the first cover 8 at a plurality of locations corresponding to different pivot angles of the second cover 9 relative to the first cover 8.

Through the above, an embodiment of the present disclosure has been described with reference to the drawings (FIGS. 1 to 9B). However, the present disclosure is not limited to the above embodiment and may be implemented in various different forms that do not deviate from the gist of the present disclosure (for example, as described below in sections (1) to (4)). Elements of configuration in a plurality of embodiments can be combined as appropriate to form various forms of disclosure. For example, some of the elements of configuration in the above embodiment may be omitted. The drawings are schematic illustrations for facilitating explanation of elements of configuration shown therein and properties of the elements of configuration in the drawings such as the number thereof may differ from actual properties thereof in order to facilitate illustration. Furthermore, elements of configuration described in the above embodiment are merely examples and are not intended as specific limitations. Various alterations may be made so long as there is no substantial deviation from the effects of the present disclosure.

(1) According to the above-described embodiment, the second cover 9 houses the feeder 1. However, the present disclosure is not limited as such. The second cover 9 does not have to house the feeder 1.

(2) According to the above-described embodiment, each of the second members 12 has two small path parts 24. However, the present disclosure is not limited as such. Each of the second members 12 may have one small path part 24. Alternatively, each of the second members 12 may have three or more small path parts 24. In a configuration in which each of the second members 12 has a plurality of small path parts 24, the small path parts 24 are for example arranged in the turning direction of the second member 12 relative to the corresponding first member 11.

(3) According to the above-described embodiment, the first members 11 are supported so as to be movable in the approaching direction L1 and in the separating direction L2 relative to the first cover 8. However, the first members 11 may be fixed to the first cover 8. Alternatively, the first members 11 may be integral with the first cover 8. In other words, the hinge mechanisms 10 do not have to have a function of moving the second cover 9 in the approaching direction L1 and in the separating direction L2 relative to the first cover 8 so long as the hinge mechanisms 10 have a function of enabling the second cover 9 to pivot relative to the first cover 8. Such hinge mechanisms 10 can have a simpler configuration.

Figure 10:
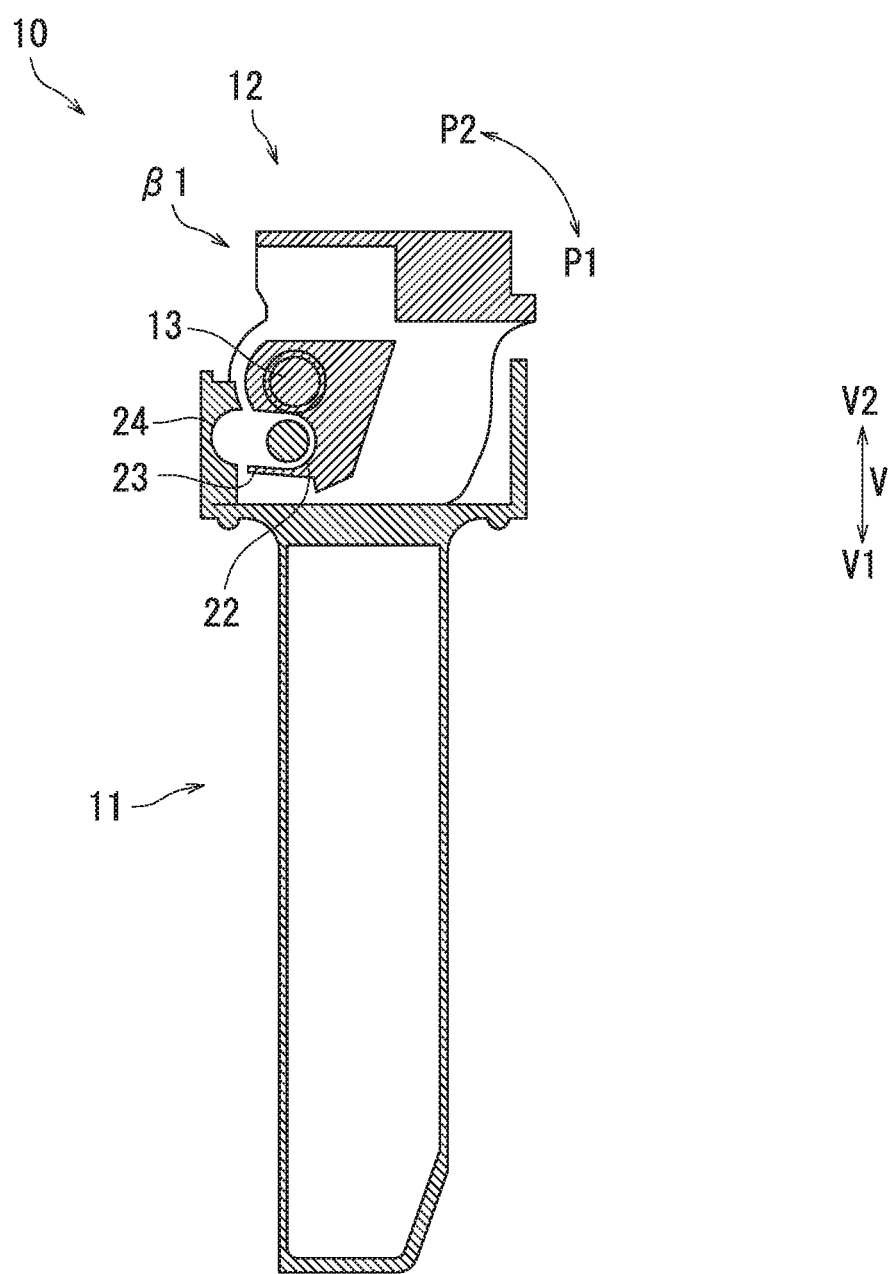
FIG. 10 is a cross-sectional view schematically illustrating a variation of the hinge mechanism.

(4) The following describes a variation of the hinge mechanisms 10 with reference to FIG. 10. FIG. 10 is a cross-sectional view schematically illustrating the variation of the hinge mechanisms 10. According to the above-described embodiment, each of the first members 11 has the large path part 23 and each of the second members 12 has the small path parts 24. However, the present disclosure is not limited as such. Each of the first members 11 may have one or more small path parts 24 and each of the second members 12 may have a large path part 23 as illustrated in FIG. 10. In a configuration in which each of the first members 11 has a plurality of small path parts 24, the small path parts 24 are for example arranged in the turning direction of the second member 12 relative to the first member 11. The variation in which each of the first members 11 has the small path parts 24 and each of the second members 12 has the large path part 23 produces a similar effect to the above-described embodiment in which each of the first members 11 has the large path part 23 and each of the second members 12 has the small path parts 24.

What is claimed is:
1. A hinge mechanism for installation between a first cover pivotably supported by a housing and a second cover movable to be placed over the first cover, the hinge mechanism comprising:
   a first member configured to be supported by the first cover;
   a second member turnably attached to the first member and configured to be fixed to the second cover; and
   a stopper mechanism configured to restrict turning of the second member relative to the first member, wherein
   the stopper mechanism has a path and a moving member provided in the path,
   the path includes a first path part located in the first member and a second path part located in the second member,
   the first member and the second member are changeable between a communication state and a non-communication state depending on a turning angle of the second member relative to the first member,
   the first member and the second member are in the communication state when the first path part and the second path part are in communication with each other, and the first member and the second member are in the non-communication state when the first path part and the second path part are not in communication with each other.

2. The hinge mechanism according to claim 1, wherein the second member is restricted from turning relative to the first member when the first member and the second member are in the communication state and the moving member is at an interface location between the first path part and the second path part.

3. The hinge mechanism according to claim 1, wherein the moving member moves under its own weight in the path.

4. The hinge mechanism according to claim 1, wherein one of the first path part and the second path part is a large path part having a size that is large enough to accommodate an entirety of the moving member, and another of the first path part and the second path part is a small path part having a size that is not large enough to accommodate the entirety of the moving member but is large enough to accommodate a portion of the moving member.

5. The hinge mechanism according to claim 4, wherein the large path part has an opening and a bottom, the large path part comes in communication with the small path part through the opening when the first member and the second member change to the communication state, and the entirety of the moving member is accommodated in the large path part when the moving member is on the bottom of the large path part.

6. The hinge mechanism according to claim 5, wherein a path direction tilts downward relative to a horizontal direction when the first cover is closed, the path direction tilts upward relative to the horizontal direction as a result of the first cover pivoting in a direction to open relative to the housing, and the path direction is a direction from the opening toward the bottom.

7. The hinge mechanism according to claim 4, wherein the path includes a plurality of the small path parts.

8. An image forming apparatus comprising:
the hinge mechanism according to claim 1;
the housing;
the first cover;
the second cover;
a reader housed in the first cover and configured to read an image from an original document; and
an image forming section housed in the housing and configured to form an image on a sheet.

* * * * *